United States Patent
Stenstrom et al.

[11] Patent Number: 5,790,476
[45] Date of Patent: Aug. 4, 1998

[54] METHODS AND SYSTEMS FOR LOCATING AN UNDERGROUND SEWER USING A BUOY

[75] Inventors: Michael K. Stenstrom, Los Angeles, Calif.; William L. Reber, Schaumburg, Ill.; Cary D. Perttunen, Shelby Township, Mich.

[73] Assignee: Motorola Inc., Schaumburg, Ill.

[21] Appl. No.: 783,713

[22] Filed: Jan. 16, 1997

Related U.S. Application Data

[63] Continuation of Ser. No. 526,938, Sep. 12, 1995, abandoned.
[51] Int. Cl.[6] .................................................. G01S 3/80
[52] U.S. Cl. .......................... 367/120; 73/19.1; 73/40.5 R
[58] Field of Search .......................... 73/40.5 R, 23.2, 73/19.1, 584, 587, 592; 367/120, 118; 324/67, 326, 329

[56] References Cited

U.S. PATENT DOCUMENTS

| | | | |
|---|---|---|---|
| 2,909,975 | 10/1959 | Ulrich | 73/40.5 P |
| 3,597,680 | 8/1971 | Haddon | 324/326 |
| 3,691,819 | 9/1972 | Guest | 73/40.5 R |
| 3,866,160 | 2/1975 | Brasier | 367/118 |
| 3,906,504 | 9/1975 | Guster et al. | 342/459 |
| 3,975,735 | 8/1976 | McCullough et al. | 324/326 |
| 4,016,748 | 4/1977 | Boyens | 73/40.5 R |
| 4,387,165 | 6/1983 | Youngblood | 73/23 |
| 4,542,344 | 9/1985 | Darilek et al. | 324/326 |
| 4,911,012 | 3/1990 | Ziska | 73/584 |
| 4,913,558 | 4/1990 | Wettervik et al. | 358/100 |
| 5,036,497 | 7/1991 | Heitman | 367/120 |
| 5,127,267 | 7/1992 | Huebler et al. | 73/584 |
| 5,412,989 | 5/1995 | Eberle et al. | 73/592 |
| 5,483,164 | 1/1996 | Moss et al. | 324/425 |

*Primary Examiner*—Ian J. Lobo
*Attorney, Agent, or Firm*—Jeffrey G. Toler

[57] ABSTRACT

A first system for locating a portion of an underground sewer includes a buoy which is released into the sewer. The buoy is carried to the portion of the sewer by a flow of fluid therein. An electronic tracking system tracks the buoy during its travel through the portion of the sewer to thereby locate the portion of the sewer. A second system includes a plurality of buoys distributed along a tethered line which are released into the sewer. The plurality of buoys are carried to the portion of the sewer by a flow of fluid therein. A location of each of the plurality of buoys within the portion of the sewer is sensed to thereby locate the portion of the sewer. The plurality of buoys are then removed from the sewer by retracting the tethered line.

29 Claims, 4 Drawing Sheets

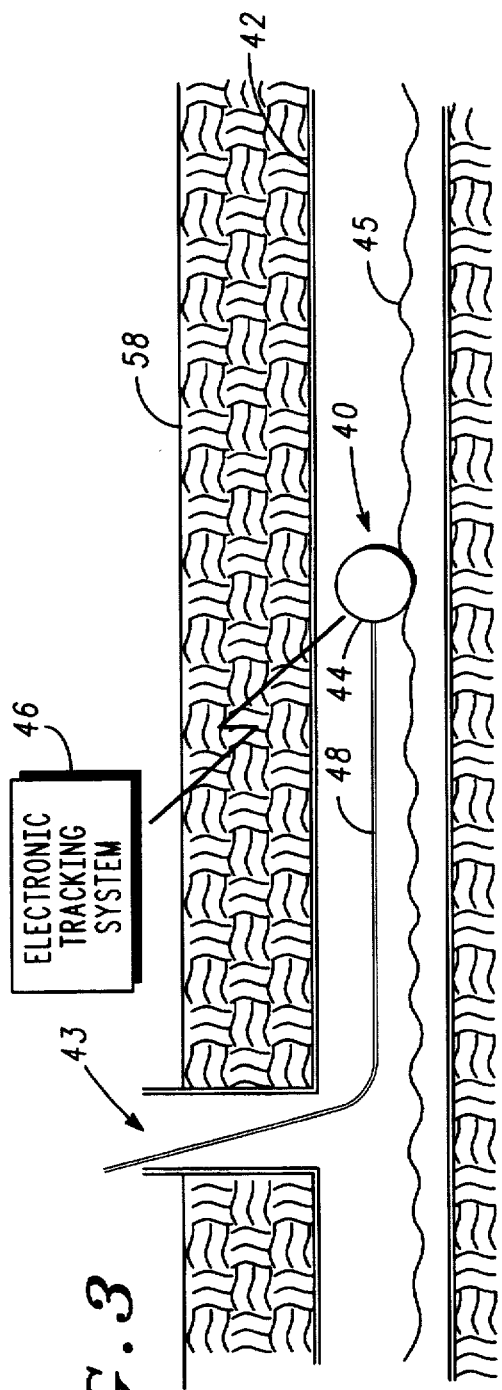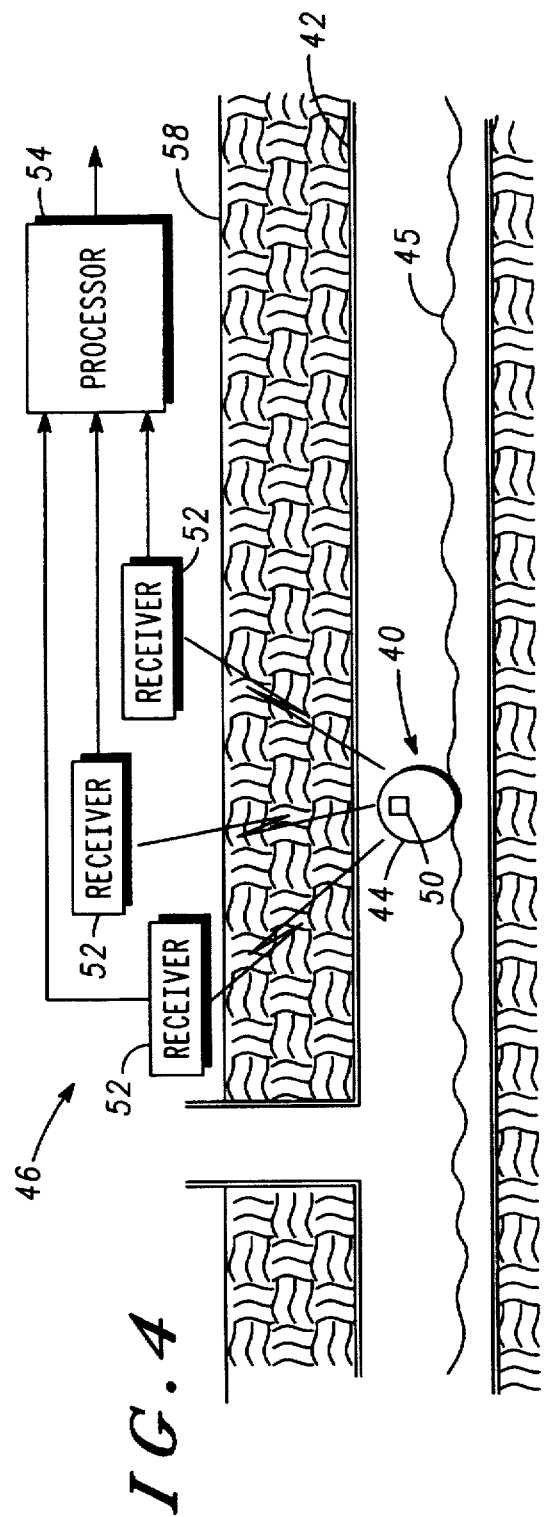

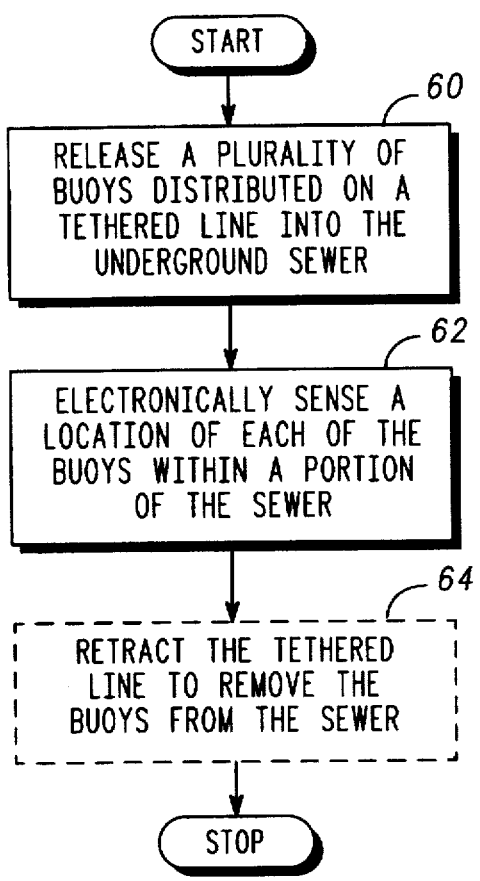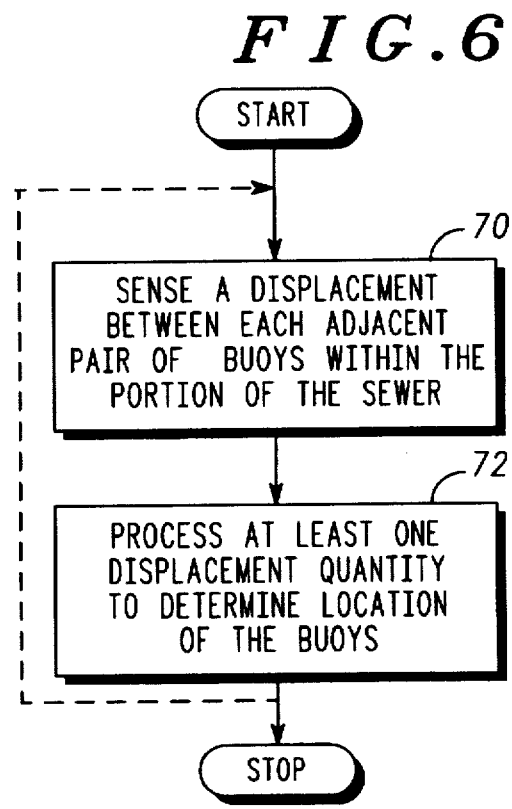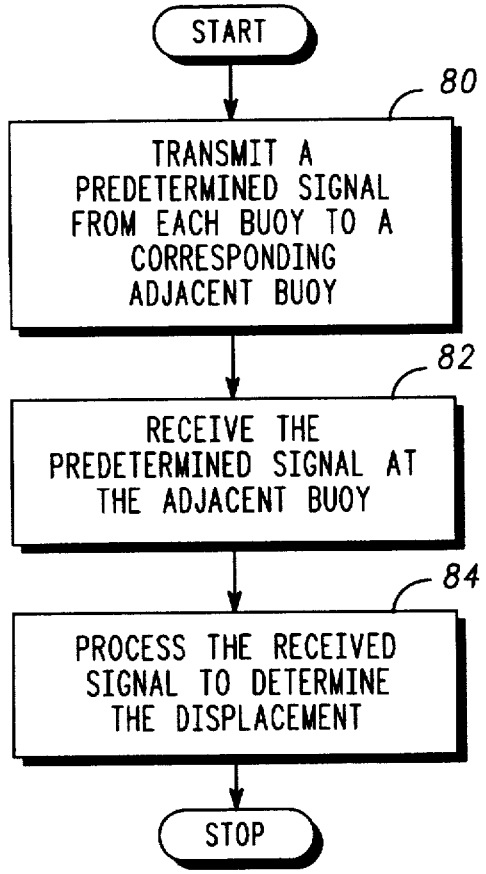

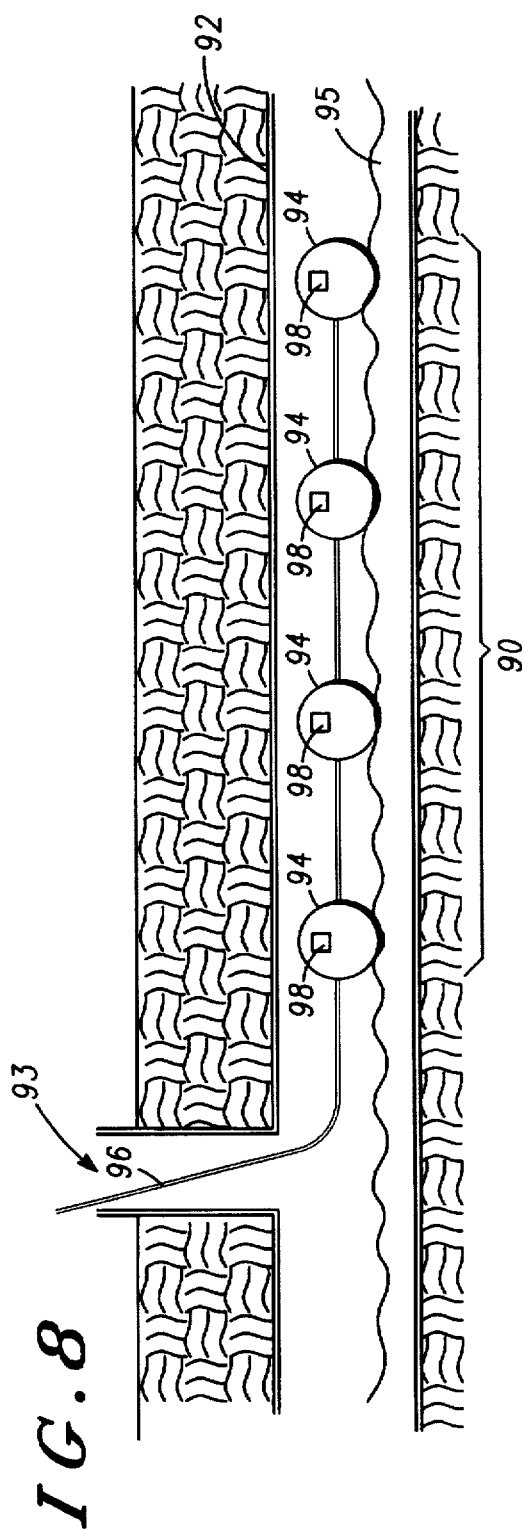
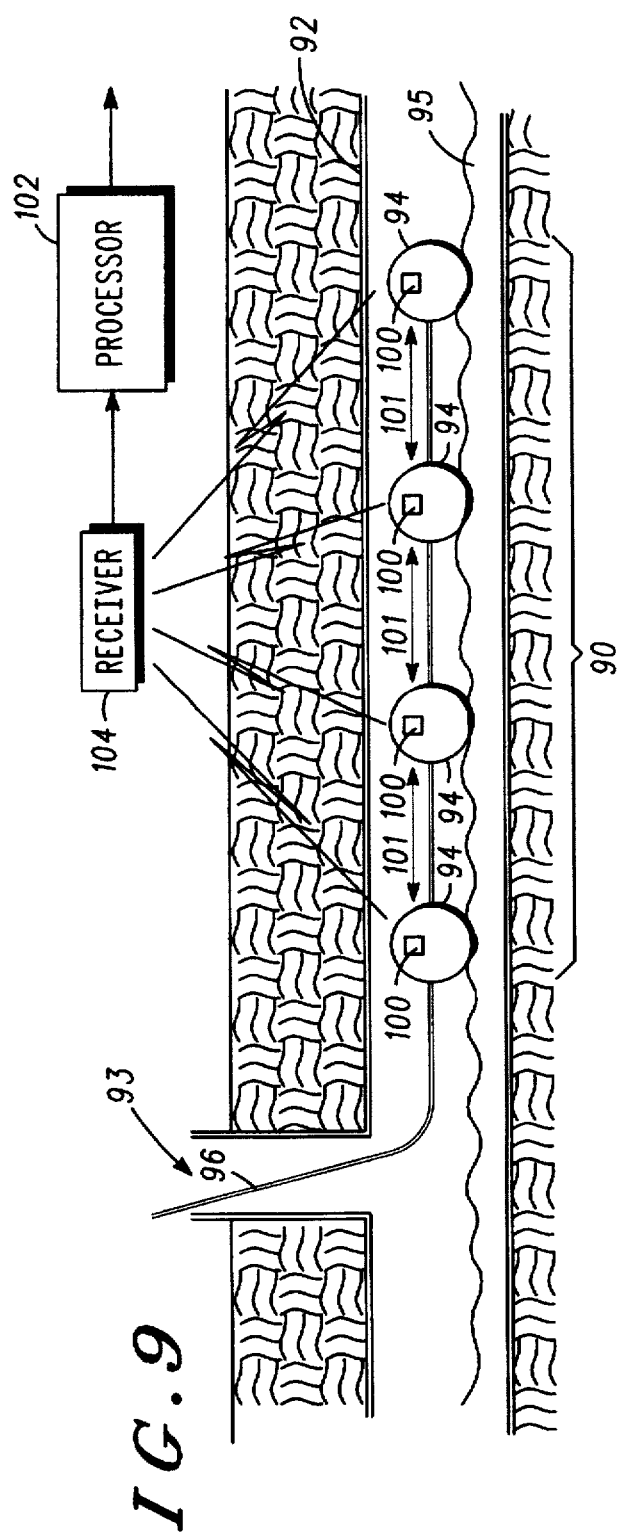

METHODS AND SYSTEMS FOR LOCATING AN UNDERGROUND SEWER USING A BUOY

This is a continuation of application Ser. No. 08/526,938, filed Sep. 12, 1995 and now abandoned.

FIELD OF THE INVENTION

The present invention relates to methods and systems for locating an underground conduit or pipe, and more specifically, to methods and systems for locating an underground sewer.

BACKGROUND OF THE INVENTION

There are a number of known methods and systems for locating an underground conduit, such as an underground sewer or an underground pipe. U.S. Pat. Nos. 4,911,012 to Ziska, 5,127,267 to Huebler et al., and 5,412,989 to Eberle et al. describe approaches wherein an acoustic signal, such as a vibration or a sound, is introduced into the conduit to cause the conduit to vibrate.

The Ziska patent discloses the introduction of a vibration having a predetermined frequency using a sound source at an above-ground location. The vibration propagates along a sewer line and is sensed by a detector located at the ground surface.

The Huebler et al. patent discloses the generation of an acoustic signal, using an above-ground audio speaker, which also propagates along the interior length of a pipe. The acoustic signal is detected by an array of detectors. The detector measuring the shortest "time-of-flight" from the audio speaker is deemed closest to the pipe.

The Eberle et al. patent describes an approach wherein a fluid contained within a conduit is excited by a speaker positioned on the conduit, such as at a meter connection or an access port. The speaker generates a variable-frequency, sinusoidal acoustic signal which causes the conduit to vibrate. The vibration of the conduit causes an elastic vibration in the media in which the conduit is buried. Measurements of the vibration are taken on the surface of the media, lateral to the estimated position of the conduit. The position of the conduit is determined by changes in the characteristics of the vibrations caused by differences in distances between the conduit and the surface.

U.S. Pat. No. 5,036,497 to Heitman describes a method and an apparatus for detecting a pipe which utilize a pulsing valve to allow water to intermittently flow and be shut off. A water-hammer effect results, which sends shock waves outward from the pipe. The shock waves are detected by two sensors which are moved in a plane at an angle to a longitudinal axis of the pipe until the detected levels of seismic energy are substantially equal.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 3 is a block diagram of an embodiment of a system for locating a portion of an underground sewer;

FIG. 4 is a block diagram of an electronic tracking system for electronically tracking the buoy in accordance with the present invention;

FIG. 5 is a flow diagram of an embodiment of a method of locating a portion of an underground sewer using a plurality of buoys distributed along a tethered line;

FIG. 6 is a flow diagram of a method of electronically sensing the location of each of the buoys within the portion of the underground sewer;

FIG. 7 is a flow diagram of a method of sensing the displacement between each adjacent pair of buoys;

FIG. 8 is a block diagram of an embodiment of a system for locating a portion of an underground sewer using a plurality of buoys distributed along a tethered line; and FIG. 9 is a block diagram of a system for electronically sensing the location of each of the buoys within the portion of the underground sewer.

DETAILED DESCRIPTION OF A PREFERRED EMBODIMENT

Embodiments of the present invention advantageously locate portions of an underground sewer by electronically tracking and/or sensing a buoy carried by a flow of fluid within the sewer. By tracking the buoy as it travels with the flow of fluid, information related to the fluid flow within the sewer can be obtained in addition to location information. Further, by tracking a plurality of buoys released into the sewer, a statistical measure of the flow of fluid therein can be formulated.

Figure 1:
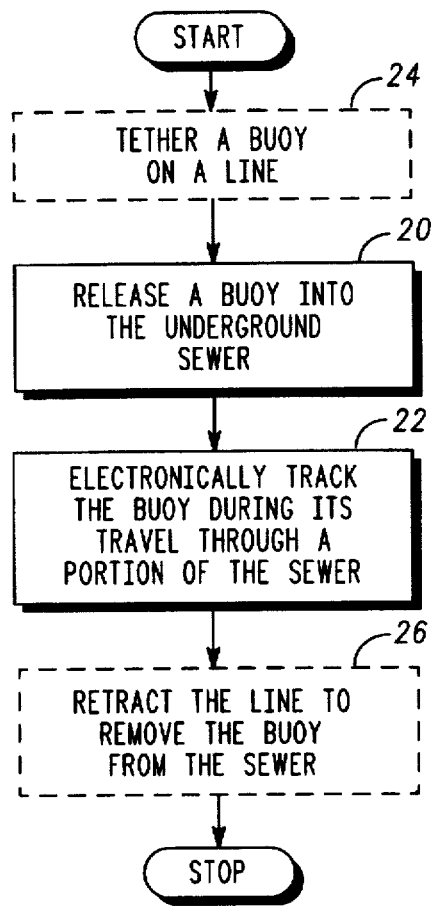
FIG. 1 is a flow diagram of an embodiment of a method of locating a portion of an underground sewer.

FIG. 1 is a flow diagram of an embodiment of a method of locating a portion of an underground sewer. As indicated by block 20, the method includes a step of releasing a buoy into the underground sewer. The buoy is carried through the underground sewer, including the portion thereof, by a flow of fluid therein. Typically, the flow of fluid is provided by in-situ sewage which ordinarily flows in the underground sewer. If desired, the flow of fluid can be influenced by controllably introducing fluid into the underground sewer.

The method further includes a step of electronically tracking the buoy during its travel through the portion of the underground sewer, as indicated by block 22. Various known approaches to electronic tracking may be utilized in this step. One embodiment of the present invention described herein utilizes a triangulation-based approach to electronically tracking the buoy.

As indicated by block 24, the method optionally includes a step of tethering the buoy on a line to restrain its travel through the underground sewer. By tethering the buoy, another optional step of retracting the line to remove the buoy from the underground sewer, as indicated by block 26, can be performed. This step is typically performed after the step of electronically tracking the buoy to determine the location of the portion of the underground sewer. As a result, the buoy can be repeatedly released and retracted at various locations to locate a plurality of portions of the underground sewer. If not tethered, the buoy is either designed for a single-use, or can be collected at an end point of the underground sewer, such as a treatment plant, for re-release into the underground sewer.

Figure 2:
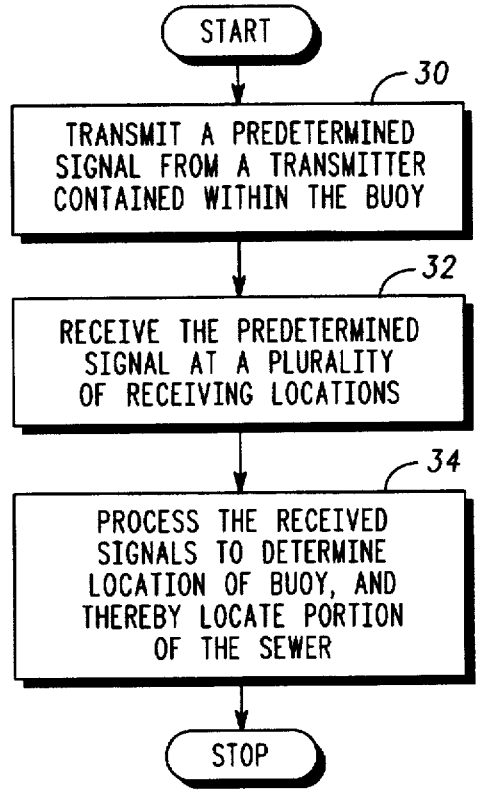
FIG. 2 is a flow diagram of a method of electronically tracking the buoy in accordance with the present invention.

FIG. 2 is a flow diagram of a method of electronically tracking the buoy in accordance with the present invention. As indicated by block 30, the method includes a step of transmitting a predetermined signal from a transmitter contained within the buoy when the buoy is within the portion of the underground sewer. The predetermined signal can be either an acoustic signal, such as an acoustic pressure wave, or an electromagnetic signal, such as a radio frequency wave. A step of receiving the predetermined signal at a plurality of receiving locations is then performed, as indicated by block 32. As a result, a plurality of received signals are provided, one received signal from each of the plurality of receiving locations.

As indicated by block 34, a step of processing the plurality of received signals is performed to determine a location of the buoy, and thereby locate the portion of the underground sewer. In a preferred embodiment, the step of processing includes a step of triangulating the plurality of received signals to determined the location of the buoy, and thereby locate the portion of the underground sewer. Although not required, the steps of transmitting, receiving, and processing are typically repeated to track the buoy during its travel through the underground sewer, i.e., to determine a plurality of locations indicative of the portion of the underground sewer.

FIG. 3 is a block diagram of an embodiment of a system for locating a portion 40 of an underground sewer 42. The system includes a buoy 44 which is released into the underground sewer 42 at a location 43. The buoy 44 is designed either to float or to suspend itself within a fluid 45 which flows in the underground sewer 42. The fluid 45 typically comprises sewage which ordinarily flows within the underground sewer 42. It is noted that various types of the fluid 45 (whether they be a liquid or a gas) are within the scope of the present invention.

The buoy 44 is carried through the underground sewer 42 to the portion 40 thereof by a flow of the fluid 45 therein. An electronic tracking system 46 electronically tracks the buoy 44 during its travel through the portion 40 of the underground sewer 42 to locate the portion 40 of the underground sewer 42. Optionally, the system includes a line 48 for tethering the buoy 44 to restrain its travel through the underground sewer 42. The line 48 can be formed of a rope, a wire, or the like. While the line 48 is shown to float on the surface, in other embodiments of the present invention the line 48 can be heavier than the surrounding matter and thus be partially or totally submerged. The line 48 further facilitates removal of the buoy 44 from the underground sewer 42 for release either at the same location 43 or at another location (not specifically illustrated).

FIG. 4 is a block diagram of an electronic tracking system for electronically tracking a buoy in accordance with the present invention. The electronic tracking system 46 utilizes a transmitter 50 contained within the buoy 44. The transmitter 50 transmits a predetermined signal when the buoy 44 is within the portion 40 of the underground sewer 42. The predetermined signal can be transmitted continuously when the buoy 44 is within the underground sewer 42, or can be selectively transmitted only when the buoy 44 is within the portion 40. The predetermined signal can be either an electromagnetic signal or an acoustic signal.

The electronic tracking system 46 includes a plurality of receivers 52 at a plurality of receiving locations. The plurality of receivers 52 receive the predetermined signal from the buoy 44 to provide a plurality of received signals. The electronic tracking system 46 further includes a processor 54 operatively associated with the plurality of receivers 52. The processor 54 processes the plurality of received signals to determine a location of the buoy 44, and thereby locate the portion 40 of the underground sewer 42. The processor 54 can process the received signal in a digital signal format using a microprocessor or the like which performs a series of program steps stored in a memory. Alternatively, the processor 54 can process the received signals in an analog signal format using analog computation circuits which are known in the art.

Preferably, the transmitter 50 repeatedly transmits the predetermined signal as the buoy 44 travels through the portion 40 of the underground sewer 42. Here, the plurality of receivers 52 repeatedly receive the predetermined signal, and the processor 54 repeatedly determines the location of the buoy 44 to track the buoy 44 during its travel through the underground sewer 42. As a result, a substantial portion of the underground sewer 42 can be located by a single buoy. Further, by tracking the buoy 44 as it travels with the flow of fluid, information related to the fluid flow within the underground sewer 42 can be obtained in addition to location information. If a plurality of buoys are released into the underground sewer 42 for tracking, a statistical measure of the flow of fluid therein can be formulated.

In one embodiment, the processor 54 determines the location of the buoy 44 by performing a step of triangulating the plurality of received signals. In this embodiment, the received signals from three of the receivers 52 proximate to the buoy 44 are utilized to triangulate the location of the buoy 44. As the buoy 44 travels through the underground sewer 42, different triplets of the receivers 52 are utilized for triangulating the location of the buoy 44. The receivers 52 are typically arranged in a predetermined grid-like formation in an area above the underground sewer 42. The receivers 52 can be located either above ground-level 58 as illustrated, or below the ground-level 58. The location of each of the receivers 52, used to triangulate the location of the buoy 44, can be determined using a global positioning satellite (GPS) receiver.

As an alternative to the above-described embodiments of the electronic tracking system, the buoy 44 can contain a receiver instead of the transmitter 50, and a plurality of transmitters can be substituted for the plurality of receivers 52. Here, the transmitters act as beacons, each transmitter transmitting a corresponding signal to be received by the receiver in the buoy 44. The buoy 44 can contain a processor for processing the signals received by the receiver to determine its location. The location of the buoy 44 is based upon knowledge of the location of the transmitters, which can be found using a GPS receiver. The buoy 44 can further contain a transmitter for transmitting location data to a receiving station on the ground. Alternatively, the location data can be stored in a memory on the buoy 44. The location data can then be retrieved after the buoy 44 is removed from the underground sewer 42.

In further embodiments of the present invention, the buoy 44 contains additional elements to provide additional features. For instance, the buoy 44 can contain a video camera to provide an image of the sewer. In this fashion, the buoy can provide wireless transmission of this imagery. Further, the buoy can contain one or more sensors such as water quality sensors. Using these sensors, the buoy and tracking system can detect and locate sources of pollution in the sewer. For instance, a hydrogen sulfide sensor on the buoy 44 could allow the buoy to track and locate the source of this compound and monitor the effectiveness of remediation techniques, if in use.

FIG. 5 is a flow diagram of an embodiment of a method of locating a portion of an underground sewer using a plurality of buoys distributed along a tethered line. As indicated by block 60, the method includes a step of releasing the plurality of buoys distributed along the tethered line into the underground sewer. The plurality of buoys are carried to the portion of the underground sewer by a flow of fluid therein. As indicated by block 62, the method further includes a step of electronically sensing a location of each of the plurality of buoys within the portion of the underground sewer to locate the portion of the underground sewer. The location of each of the plurality of buoys can be electronically sensed using the aforementioned methods and systems for sensing the location of a single buoy. Other alternative approaches for electronically sensing the locations are described hereinafter.

Preferably, the method further comprises a step of retracting the tethered line to remove the plurality of buoys from the underground sewer, as indicated by block 64. The step of retracting is performed after sensing the location of each of the plurality of buoys within the portion of the underground sewer.

FIG. 6 is a flow diagram of a method of electronically sensing the location of each of the buoys within the portion of the underground sewer. This method is an alternative to the aforementioned methods and systems for locating a single buoy. A step of sensing a displacement between each adjacent pair of buoys within the portion of the underground sewer is performed, as indicated by block 70, to produce thereby at least one displacement quantity. It is noted that the term "displacement" includes directional information not necessarily associated with the term "distance". Hence, the displacement quantity can be in the form of a vector or at least one angle quantity representative of the displacement from one buoy to an adjacent buoy.

Thereafter, a step of processing the at least one displacement quantity is performed, as indicated by block 72, to determine the location of each of the plurality of buoys within the portion of the underground sewer and thereby locate the portion of the underground sewer. If the absolute location of one of the buoys is known (using the methods and/or systems described herein for locating a single buoy, for example), then the location of each of the other buoys can be found by successively adding each displacement quantity, in a suitable form, to the known, absolute location.

If desired, the steps of sensing and processing can be repeated to track the plurality of buoys during their travel through the underground sewer.

FIG. 7 is a flow diagram of a method of sensing the displacement between each adjacent pair of buoys. As indicated by block 80, a step of transmitting a predetermined signal from each of the plurality of buoys to a corresponding adjacent one of the plurality of buoys is performed. The predetermined signal can be an electromagnetic signal or an acoustic signal. Thereafter, a step of receiving the predetermined signal at the corresponding adjacent one of the plurality of buoys is performed, as indicated by block 82. Next, as indicated by block 84, a step of processing the received, predetermined signal is performed to determine the displacement.

The steps of receiving and processing act to determine the direction from which the predetermined signal is transmitted. Optionally, these steps further determine the distance between the adjacent pair of buoys.

FIG. 8 is a block diagram of an embodiment of a system for locating a portion 90 of an underground sewer 92 using a plurality of buoys 94 distributed along a tethered line 96. The plurality of buoys 94 are released into the underground sewer 92 at a location 93, and are carried to the portion 90 by a flow of a fluid 95 in the underground sewer 92. Once within the portion 90 of the underground sewer 92, the plurality of buoys 94 are restrained to travel further by the tethered line 96. The tethered line 96 further facilitates removal of the plurality of buoys 94 from the underground sewer 92 by retraction thereof.

The system further includes sensors 98 which provide means for electronically sensing a location of each of the plurality of buoys 94 within the portion 90 of the underground sewer 92 to thereby locate the portion 90 of the underground sewer 92. The location of each of the plurality of buoys can be electronically sensed using the aforementioned systems for sensing the location of a single buoy, or an alternative whose description follows.

FIG. 9 is a block diagram of a system for electronically sensing the location of each of the buoys within the portion of the underground sewer. The system includes displacement sensors 100 which provide means for sensing a displacement 101 between each adjacent pair of buoys 94 within the portion of the underground sewer, and for producing thereby at least one displacement quantity. The system further includes a processor 102 operatively associated with the displacement sensors 100. The processor 102 processes the at least one displacement quantity to determine the location of each of the plurality of buoys 94 within the portion 90 of the underground sewer 92 and thereby locate the portion 90 of the underground sewer 92.

The at least one displacement quantity can be provided to the processor 102 via a receiver 104 which receives the at least one displacement quantity when the buoys 94 are within the underground sewer 92. Alternatively, the at least one displacement quantity can be stored in a memory (not specifically illustrated) connected to the buoys 94. Here, the at least one displacement quantity can be retrieved by the processor 102 after the buoy 94 is removed from the underground sewer 92.

As stated earlier, if the absolute location of one of the buoys is known, then the location of each of the other buoys can be found by successively adding each displacement quantity to the known, absolute location.

In one embodiment, the displacement sensors 100 repeatedly senses the displacement between each adjacent pair of buoys, and the processor 102 repeatedly processes the at least one displacement quantity to track the plurality of buoys during their travel through the underground sewer.

Figure 10:
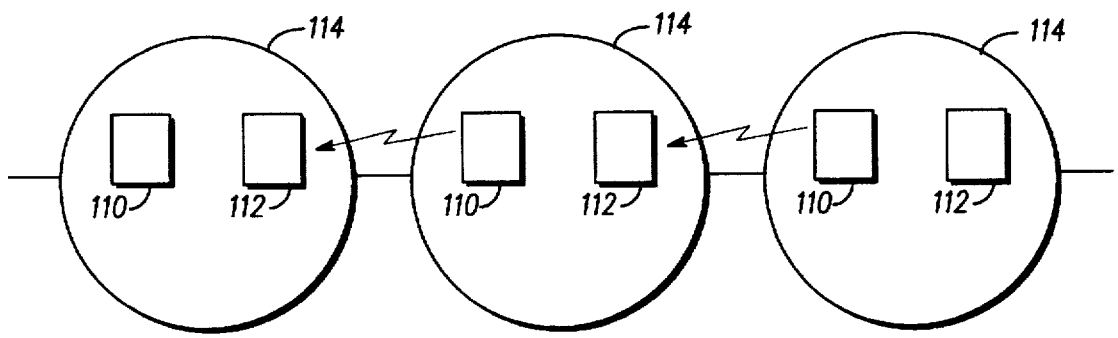
FIG. 10 is a block diagram of a system for sensing the displacement between adjacent pairs of buoys.

FIG. 10 is a block diagram of a system for sensing the displacement between adjacent pairs of buoys. The system includes a transmitter 110 and a receiver 112 for each of the plurality of buoys 114. Each transmitter 110 transmits a first predetermined signal to a first adjacent one of the plurality of buoys 114. Each receiver 112 receives a second predetermined signal from a second adjacent one of the plurality of buoys 114. The first predetermined signal and the second predetermined signal can be either acoustic signals or electromagnetic signals.

The receiver 112 acts to determine the direction from which the second predetermined signal is transmitted in order to sense the displacement. Optionally, the receiver 112 further determines the distance between the adjacent pair of buoys. Known systems for signal direction finding and ranging can be applied for these purposes.

Although described in terms of locating an underground sewer, it should be noted that embodiments of the present invention can be applied for locating other types of conduits or pipes. It is further noted that the selection of a particular type of signal for use in embodiments of the present invention may be based upon the type of material of which the sewer, conduit, or pipe is comprised (e.g. PVC, concrete, or metal).

Thus, there has been described herein a concept, as well as several embodiments including preferred embodiments of methods and systems for locating a portion of an underground sewer using a buoy.

Because the various embodiments of the present invention electronically locate buoys traveling within the sewer, they provide a significant improvement in that larger portions of the sewer can be located in comparison to previous methods and systems.

Additionally, the various embodiments of the present invention as herein-described track one or more buoys which travel within the sewer to provide information related to the fluid flow within the sewer in addition to sewer location information.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A system for monitoring a sewer, the system comprising:
    a buoy;
    a camera associated with the buoy to provide at least one image within the sewer; and
    a hydrogen sulfide sensor associated with the buoy to detect a source of hydrogen sulfide within the sewer.

2. The system of claim 1 further comprising a buoy locating system to locate the buoy and thereby locate the source of the hydrogen sulfide detected within the sewer.

3. The system of claim 2 wherein the buoy locating system comprises:
    a receiver associated with the buoy;
    a plurality of transmitters which communicate with the receiver; and
    a processor operatively associated with the receiver to determine a location of the buoy.

4. The system of claim 3 wherein the plurality of transmitters are arranged as a grid in an area above the sewer.

5. The system of claim 3 further comprising a memory associated with the buoy and operatively associated with the processor to store location data determined thereby.

6. The system of claim 1 wherein the hydrogen sulfide sensor detects the hydrogen sulfide while the buoy is carried by a flow of fluid within the sewer.

7. The system of claim 1 wherein the buoy is untethered, the system further comprising a transmitter associated with the camera to wirelessly transmit the at least one image while the buoy is carried by a flow of fluid within the sewer.

8. A method of monitoring a sewer, the method comprising the steps of:
    releasing a buoy into the sewer;
    capturing at least one image within the sewer using a camera associated with the buoy; and
    detecting a source of hydrogen sulfide within the sewer using a hydrogen sulfide sensor associated with the buoy.

9. The method of claim 8 further comprising the step of locating the buoy to locate the source of the hydrogen sulfide detected within the sewer.

10. The method of claim 9 further comprising the step of communicating location data from a transmitter associated with the buoy to a receiving station.

11. The method of claim 8 wherein the hydrogen sulfide sensor detects the hydrogen sulfide while the buoy is carried by a flow of fluid within the sewer.

12. The method of claim 8 wherein the buoy is carried through a portion of the sewer by a flow of fluid in the sewer.

13. The method of claim 8 wherein the buoy is untethered, the method further comprising the step of wirelessly transmitting the at least one image while the buoy is carried by a flow of fluid within the sewer.

14. A system for monitoring a sewer, the system comprising:
    a buoy;
    a hydrogen sulfide sensor associated with the buoy to detect a source of hydrogen sulfide within the sewer; and
    a buoy locating system to locate the buoy and thereby locate the source of the hydrogen sulfide detected within the sewer.

15. The system of claim 14 wherein the buoy locating system comprises:
    a transmitter associated with the buoy;
    a plurality of receivers in communication with the transmitter; and
    a processor operatively associated with the plurality of receivers to determine a location of the buoy using three of the plurality of receivers.

16. The system of claim 15 wherein the plurality of receivers are arranged as a grid in an area above the sewer.

17. The system of claim 14 wherein the buoy locating system comprises:
    a receiver associated with the buoy;
    a plurality of transmitters which communicate with the receiver; and
    a processor operatively associated with the receiver to determine a location of the buoy.

18. A method of monitoring a sewer, the method comprising the steps of:
    releasing a buoy into the sewer;
    detecting a source of hydrogen sulfide within the sewer using a hydrogen sulfide sensor associated with the buoy; and
    electronically locating the buoy to locate the source of the hydrogen sulfide within the sewer.

19. The method of claim 18 wherein the step of electronically locating the buoy includes:
    transmitting a signal from a transmitter associated with the buoy;
    receiving the signal at three receiving locations to produce three received signals; and
    processing the three received signals to determine a location of the buoy.

20. The method of claim 19 wherein the three receiving locations are arranged as a grid in an area above the sewer.

21. The method of claim 18 wherein the step of electronically locating the buoy includes:
    transmitting a plurality of signals from a plurality of locations;
    receiving the plurality of signals by a receiver associated with the buoy; and
    processing the plurality of signals received by the receiver to determine a location of the buoy.

22. The method of claim 21 wherein the plurality of locations are arranged as a grid in an area above the sewer.

23. The method of claim 18 further comprising the step of storing location data using a memory associated with the buoy.

24. The method of claim 23 further comprising the step of retrieving the location data from the memory after the buoy is removed from the sewer.

25. The method of claim 18 further comprising the step of collecting the buoy at an end point of the sewer other than a point at which the buoy is released into the sewer.

26. The method of claim 25 wherein the end point is at a treatment plant.

27. The method of claim 25 further comprising the step of re-releasing the buoy into the sewer after collecting the buoy at the end point, the buoy re-released at a point other than the end point.

28. A system for monitoring a sewer, the system comprising:

a buoy;

a video camera associated with the buoy to provide at least one image within the sewer while the buoy is traveling through the sewer by a flow of fluid within the sewer;

a transmitter associated with the buoy and the video camera to transmit the at least one image while the buoy is within the sewer;

a hydrogen sulfide sensor associated with the buoy to detect a source of hydrogen sulfide within the sewer while the buoy is carried by a flow of fluid within the sewer; and a buoy locating system to locate the source of hydrogen sulfide detected within the sewer.

29. A method of monitoring a sewer, the method comprising the steps of:

releasing a buoy into the sewer;

capturing at least one image within the sewer using a video camera associated with the buoy, the at least one image captured while the buoy is traveling through the sewer by a flow of fluid within the sewer;

transmitting the at least one image while the buoy is within the sewer;

detecting a source of hydrogen sulfide within the sewer using a hydrogen sulfide sensor associated with the buoy, the source of hydrogen sulfide detected while the buoy is carried by a flow of fluid within the sewer; and electronically locating the buoy to locate the source of hydrogen sulfide within the sewer.

* * * * *